United States Patent [19]
Wilson et al.

[11] Patent Number: 4,863,144
[45] Date of Patent: Sep. 5, 1989

[54] PLUG VALVE

[75] Inventors: A. Kenneth Wilson, Aurora; John V. Ballun, Oswego, both of Ill.

[73] Assignee: AMSTED Industries Incorporated, Chicago, Ill.

[21] Appl. No.: 259,901

[22] Filed: Oct. 19, 1988

[51] Int. Cl.⁴ ............................................. F16K 5/04
[52] U.S. Cl. .................................. 251/316; 251/298; 251/363
[58] Field of Search ............... 251/171, 298, 304, 309, 251/314, 316, 363; 137/514

[56] References Cited
U.S. PATENT DOCUMENTS
4,137,935 2/1979 Snowdon ..................... 251/298 X
4,640,492 2/1987 Carlson, Jr. ................... 251/314 X Primary Examiner—John Fox
Attorney, Agent, or Firm—Charles E. Bouton; Edward J. Brosius

[57] ABSTRACT

An eccentric plug valve and method for assembly wherein the valve utilizes a replaceable valve set which is placed against a gasket held in a groove about a rim of a valve opening within the valve body and the valve seat is held in position by means to fasten one side of the insert to the valve body and by a groove in the bottom of the valve cavity and a cam ledge on a valve cover which engage the bottom and top edges of the insert, respectively.

17 Claims, 3 Drawing Sheets

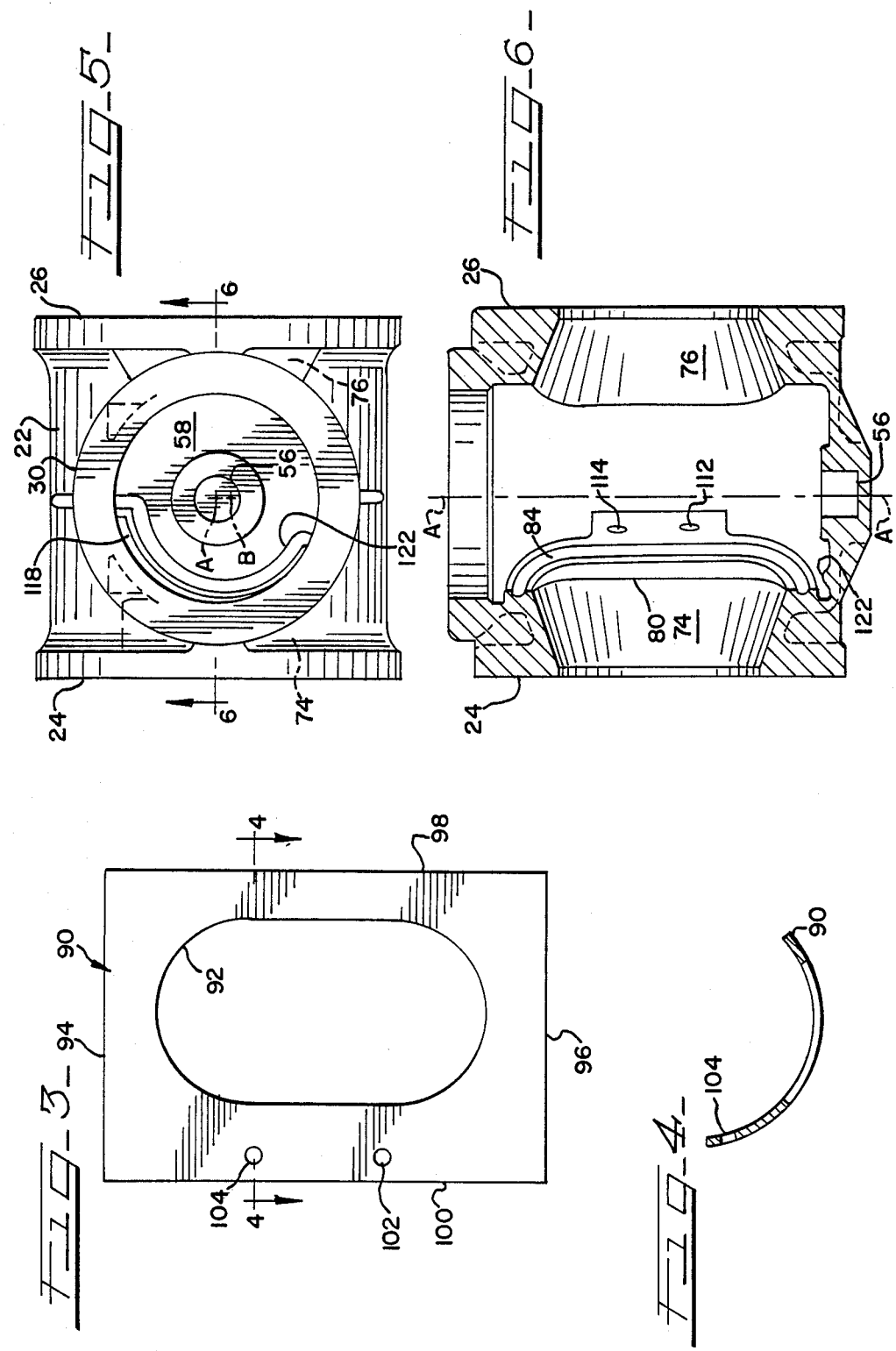

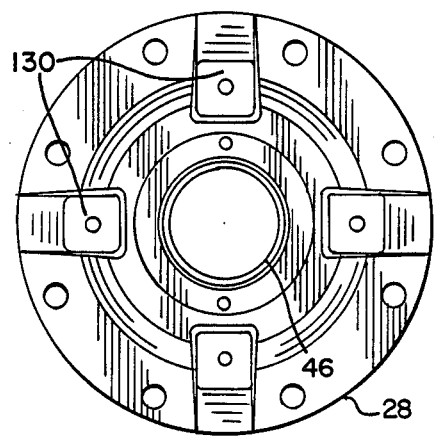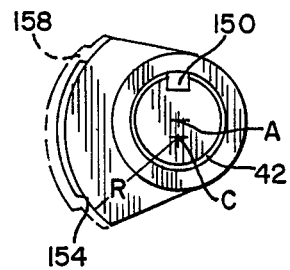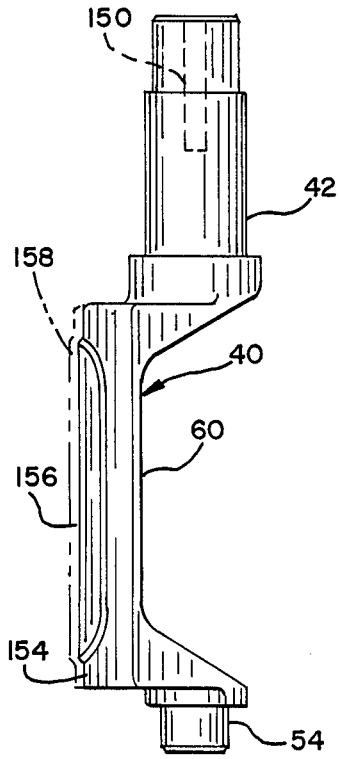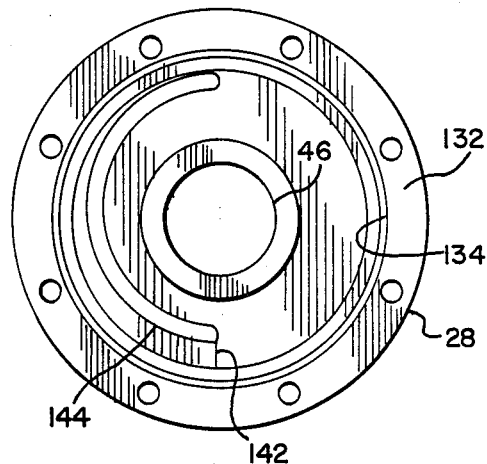

PLUG VALVE

The present invention relates generally to valves and more particularly to an improved rotary eccentric plug valve with a replaceable valve seat mounted to the valve body and a method of assembling the valve with replaceable seat.

BACKGROUND OF THE INVENTION

Eccentric rotary plug valves are well known and represent a highly developed area of technology. In such valves a plug or closure member is mounted for rotation in a generally cylindrical body with the axis of plug rotation slightly offset from the axis of the valve body, or more specifically, offset from the axis of that part of the body against which the plug closes—hence the eccentric nature of the valve.

Plug valves have inlets and outlets which usually are aligned and typically are sized to connect with pipes ranging from 3 to 48 inches in diameter. Normally the plug or closure member is rotated from an open position, at one side of the cylindrical valve body, toward the interior face of the valve inlet where it becomes seated to fully close the valve. So as to minimize sliding contact of the respective plug and mating seat surface and provide seating adjustment, it has been known to make that portion of the interior cylindrical surface surrounding the valve inlet slightly eccentric to the valve body axis (such as by generating that portion of the interior surface from an axis offset from the axis of plug rotation), and to also make the corresponding cylindrical closure face of the plug slightly eccentric to the axis of rotation which, in this construction may coincide with the valve body axis. The seating end of the valve is hereinafter referred to as the inlet end; however, it may actually be at either the inlet or outlet end depending on the orientation of the valve in the pipeline.

Most often either the plug or mating body seat surfaces have fused or welded seats of relatively harder and resistant metal which are machined in plate to a smooth finish. Such seats have several disadvantages including high manufacturing cost, corrosion susceptibility and difficulty, if not impossibility, to replace or renew upon excessive wear. Also when the valve seat is at the inlet end, hydraulic pressure against the plug of the closed valve tends to separate the plug from the body seat and if any play develops in the plug, there will be leakage around the seat. U.S. Pat. No. 2,574,428 appears to disclose a replaceable composite valve seat which positions a resilient ring for contact by a cast plug closure which is not described in detail. U.S. Pat. No. 4,697,786 discloses a recent attempt to devise at least one form of a replaceable plug valve seat. However, that form of valve requires a composite machined metal plug closure, and the replaceable seat in the valve body inlet is believed likely to be displaced by the pressure of liquid as the valve is partially opened.

SUMMARY OF THE INVENTION

Accordingly, it is a principle object of the present invention to provide an improved valve and method of assembly wherein a valve seat in the valve body adjacent the inlet is replaceable.

It is another object of the present invention to provide an improved plug valve with a replaceable seat in the valve body and a resiliently coated mono-metal plug closure to fit and seal against the replaceable seat.

It is a further object of the present invention to provide an improved plug valve with a replaceable seat in the valve body which seat is arranged to utilize any displacement by hydraulic forces so as to self seal against the plug closure member.

It is still another object of the present invention to provide an improved plug valve with a replaceable seat in the valve body wherein the valve body and plug components each may be of cast single metal and none of the closure cast surfaces need be machine finished.

Briefly stated the present invention is an assembled valve, particularly a plug valve, utilizing body, plug and cover parts which are each cast of a single metal and (other than cover and connecting flanges), requiring a machine finish on a minimum of interior components such as on the plug shafts and mating body and cover trunnions, and wherein a replaceable, relatively flexible, seat is held against a resilient gasket laid in a groove cast in the valve body about the interior of the valve inlet opening.

The upper and lower edges of the metal seat are held against the gasket by ledges in the valve body bottom and the valve cover; and preferably the replaceable seat is secured to the valve body at a far side of the seat, in the direction of clossing movement of the plug closure member.

A preferred method to assemble the valve is to insert the replaceable seat against a ledge in the valve body bottom, also insert the plug closure member into the valve body in an open position and piloting a cover member on to the valve body with an internal ledge angularly offset from the bottom ledge, and then rotating the cover so as to align the ledges and press and secure the upper edge of the metal seat against the gasket.

BRIEF DESCRIPTION OF THE DRAWINGS

Further object and advantages of the present invention will become apparent from the following detailed description when read in conjunction with the drawings wherein:

FIG. 3 is a front elevation of a metal seat insert appearing partly in section in FIG. 2;

FIG. 4 is a sectional view of the metal seat insert taken at line 4—4 in FIG. 3;

FIG. 5 is a plan view of a valve body according to the embodiment of FIG. 1 with other parts removed;

FIG. 6 is a sectional elevation view of the valve body taken at line 6—6 in FIG. 5;

FIG. 7 is a top plan view of a valve cover member removed from the embodiment of FIG. 1;

FIG. 8 is a bottom plan view of the valve cover member shown in FIG. 7;

FIG. 9 is a detailed side elevation view of a plug closure member removed from the embodiment of FIG. 1; and FIG. 10 is a top plan detailed view of the plug closure member of FIG. 9.

DETAILED DESCRIPTION OF THE INVENTION

Figure 1:
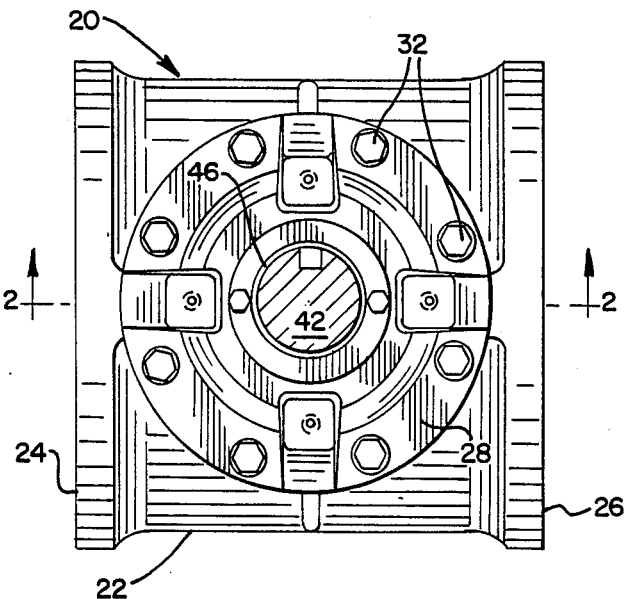
FIG. 1 is a top plan view of an assembled preferred plug valve embodiment of the present invention.
Figure 2:
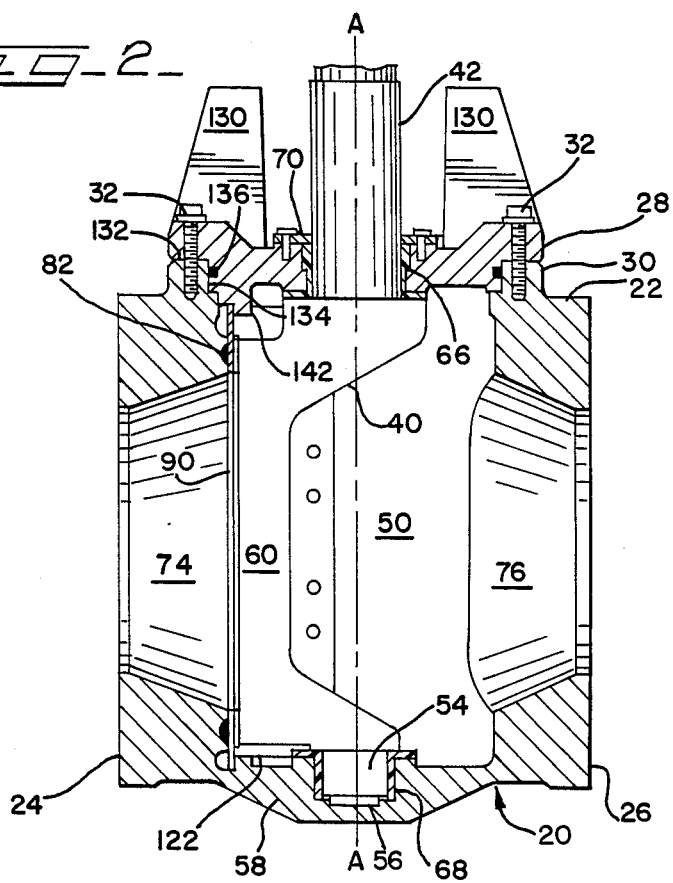
FIG. 2 is a sectional elevation view of the valve taken at line 2—2 in FIG. 1.

Referring first to FIGS. 1 and 2 of the drawings it will be seen that a preferred embodiment of the present invention is a plug valve generally 20 comprising a cast iron body 22, having aligned inlet and outlet flanges 24, 26 at opposite ends, a cover 28 secured to an upper flange 30 of the valve body 22 by a plurality of bolts 32 and a plug closure member generally 40 positioned within the valve body 22 with a drive shaft 42 extending upwardly through a trunnion opening 46 in cover 28.

The plug closure member generally 40 is rotatable about a vertical axis (the axis of drive shaft 42) which, in this embodiment, also corresponds to an axis A—A of a substantially cylindrical cavity 50 within the valve body 22 and the cover 28 and upper cover flange 30. A lower shaft 54, extending beneath the plug closure member 40, is seated in a lower trunnion 56 which is formed in the bottom wall 58 of valve body 22; and an offset crank arm 60 interconnects the drive shaft 42 and shaft 54.

As may be seen in FIG. 2 the cover trunnion 46 may be provided with a sleeve bearing 66 and similarly a sleeve bearing 68 may be provided in lower trunnion 56 to reduce the force needed to move the plug closure member 40. Additionally, a packing gland 70 is secured to the cover 28 concentric to the drive shaft 42. Within the valve body 22 there are flared inlet and outlet passageways 74, 76 extending from the inlet flange 24 and outlet flange 26, respectively, to the cavity 50. (Each flange 24, 26 may contain bolt holes for connection to mating pipe flanges—not shown.) As seen in FIGS. 2 and 6 there is an interior inlet rim 80 of the cavity 50, peripheral to the junction with inlet passageway 74, with a resilient gasket 82 seated in a groove 84 formed in the rim; and a relatively thin somewhat flexible and removable valve seat generally 90 overlaps the gasket 82. It is preferred that the groove 84 be non-rectangular in cross section, that is the groove should advantageously have a "V" or curved cross section, so as to enable compression of the gasket to the point that the seal insert 90 will fully contact the inlet rim. This cross section also allows for casting draft thereby eliminating additional core mold pieces.

It is understood that while a preferred embodiment of a valve is described herein with reference to the valve seat being located at the valve inlet, it is also possible to reverse the structure so as to orient the valve seat to the outlet end. Also it is to be understood that a preferred valve seat 90 is comprised of a metal such as stainless steel, however, it is within the scope of the invention to use other materials such as plated metal, coated metal and non-metallic compositions.

As best shown in FIGS. 3 and 4 the removable valve seat insert generally 90 is a rectangular web (part cylindrical in transverse direction so as to conform to the shape of the cavity 50) having a central opening 92, upper and lower edges 94, 96 and two sides 98, 100. The opening 92 is shaped to closely correspond to the juncture of cavity 50 and inlet passageway 74. Preferably one side 100 of the valve seat insert 90 is configured to accommodate means to fasten the insert to the interior of the valve body 22. In the illustrated preferred embodiment such fastening means is in the form of a pair of threaded bolts or screws, not shown, and the valve seat insert is provided with a pair of bolt holes 102, 104. As will become clear it is preferred that the valve seat insert 90 have a degree of flexibility and the thickness of the insert 90 is largely determined by that criterion. Furthermore, the valve seat insert 90 is fabricated from a material, usually metal, that permits such flexibility and, more importantly, has characteristics appropriate to the fluid to flow through the valve. Thus the material may be chosen to be non-reactive and/or corrosion resistant and the like. Stainless steel may readily be employed.

The interior of the valve body 22 is best seen in FIGS. 5 and 6. Groove 84 (for gasket 82) and threaded holes 112 and 114 for valve insert fasteners are illustrated in FIG. 6. The cylindrical form of the valve body cavity 50 generated from axis A—A is apparent in FIG. 5 although it will be noted that a portion of the cavity wall 118 surrounding the inlet passageway 74, and extending beyond the inlet rim 80 projects inwardly. That portion 118 is also essentially cylindrical but is generated from an axis B slightly offset from axis A—A (points B and A in FIG. 5). On the bottom wall 58 of the valve body 22 there is an arcuate foot ledge 122 that is concentric with cavity wall portion 118 and slightly inward thereof so as to leave a small gap to receive the lower edge 96 of the valve seat insert 90.

Referring now to FIGS. 2, 7 and 8 for details of the valve cover generally 28, it will be seen that a plurality of upwardly extending dogs 130 may be provided for the purpose of interconnecting with a valve actuator which functions to mechanically move the plug closure member 40. The inner face of the cover 28 includes an outer annular land 132 and an inwardly extending shoulder 134 that holds a seal ring 136 in sealing engagement with the valve body. Along one portion of the cover 28 inner face that is intended to be positioned adjacent the valve inlet 74 there is another arcuate ledge 142 having a cam face 144. The ledge 142 will essentially correspond to ledge 122 on the bottom 58 of valve body 22, when the cover 28 is secured in place, and thereby engage the cam face 144 with the upper edge 94 of the valve seat insert 90 to press it against the gasket 82.

In FIGS. 9 and 10 details of the plug closure member generally 40 may be seen. The drive shaft 42 is provided with a keyway 150 so that it may be engaged by a valve actuator (not shown) or suitable wrench for turning the shaft and plug closure member. As described hereinbefore the drive shaft 42 extends through the cover 28 and an aligned shaft 54 is seated in trunnion 56 at the bottom wall 58 of the valve body 22. The interconnecting crank arm 60 functions to close and open the valve inlet upon appropriate rotation of the drive shaft 42. To that purpose the crank 60 includes a relatively broad and cylindrical outer face 154 which is generated from an axis C (shown in FIG. 10) slightly offset from the axis A of shafts 42 and 54 (which correspond to the main axis A—A of the valve cavity 50 when assembled) so that it will be congruent with the cavity wall portion 118 when the valve parts are assembled and closed.

Additionally the crank face 154 preferably has an embossment 156 which is shaped to mate with the central opening 92 in the valve seat insert 90. Further it is preferred that the entire crank face 154 and embossment 156, are covered with a layer 158 comprised of a resilient substance such as rubber or plastic so as to better fit and seal against the opening 92 in the valve seat insert 90 when closed thereon. It will be understood that the plug closure member generally 40 is rotated between a valve open position, where the crank 60 is to one side of the inlet opening (e.g. downwardly with respect to FIGS. 1 and 5), and a valve closed position, where the crank 60 is toward the inlet passageway 74 with the face 154 aligned therewith (e.g. as shown in FIG. 2 and to the left in FIGS. 1 and 5).

The aforedescribed valve may be assembled from the illustrated parts by an advantageous and novel method. Firstly the gasket 82, which is essentially in the form of a large O-ring, is laid in the groove 84 at the inlet rim 80. Next the valve seat insert 90 is laid over the gasket 82, convex surface toward the inlet with its lower edge 96 inserted in the gap between bottom ledge 122 and the cavity wall portion 118. Then, if fastening means such as bolts or screws are to be employed, the fasteners are emplaced to secure the far side 100 (respecting plug closure movement) of the insert 90 to the valve wall. The foregoing steps may conveniently be undertaken with the valve axis A—A horizontal and the inlet flange 24 downward; and if so the valve body 22 may next be conveniently turned upright to place the axis A—A vertically.

The plug closure member generally 40 is then inserted into the valve cavity 50 with the crank face 154 turned to the open position and the stub shaft 54 inserted into the bearing 68 in trunnion 56. Then the cover 28 is fitted over the drive shaft 42 and, most importantly, the cover is oriented to generally register the arcuate ledge 142 with the outlet passageway 76 of the valve body 22. While so oriented the cover 28 is fully entered into the upper cover flange 30 of the valve body 22 and only then is the cover rotated about axis A—A so as to align its arcuate ledge 142 with inlet passageway 74 and the arcuate ledge 122 on the bottom 58 of the valve body. The latter movement of the cover 28 causes the cam face 144 of ledge 142 to engage and slide across the inner face of the upper edge 94 of valve seat insert 90. This results in the upper part of the insert 90 being pressed forcefully against the gasket 82 and held in that position. The cover 28 is then secured, as by bolting, to flange 30.

Thereafter the plug closure member 40 may be operated and the assembled valve may be installed with piping connected to the inlet and oulet flanges 24, 26. It is to be understood that when the plug closure member 40 is moved to the closed position, sliding movement between crank face 154 and the inner surface of valve seat insert 90 is minimal due to the eccentric construction heretofore described. The fastening means securing side 100 of the seat insert 90, being on the far side respecting movement of plug closure member 40, never contacts or interferes with the crank face 154 or coating layer 158. Notably the hydraulic pressure in the pipe connected to valve inlet flange 24, which is exerted against the crank face 154, will not cause separation of that face 154 from the valve seat, but instead will tend to cause the valve seat to flex at the central opening 92 against the face 154 and the resilient coating layer 158 thereon. Such hydraulic pressure will also apply against the gasket 82 and thereby tend to force the gasket from between the groove 84 and valve seat insert 90 and into the valve cavity 50 when the valve is rapidly opened. This tendency is particularly bothersome during the period that the valve is partially open and especially as the opening movement of plug closure member 40 is commenced. However, in the present valve structure the fastening means prevents flexing of the mid portion of side 100 of insert 90 and the ledges 142 and 122 and the crank face 154, itself, hold the top and bottom edges 94, 96 and other side 98 of the valve seat insert 90 against flexure and thereby prevents loss of the gasket 82.

The foregoing preferred embodiment may be modified without departing from the spirit and scope of the invention which is defined in the following claims.

What is claimed is:

1. An improved valve wherein a valve closure member is rotatable within a cavity of a valve body so as to move from one side of said valve body to oppose one of an inlet and outlet rim in a wall of said cavity, said improvement comprising:
   a peripheral groove formed in the one rim;
   a resilient gasket laid in said groove; and
   a thin replaceable seat insert placed over said gasket within said cavity so as to overlay said one rim, said groove and said gasket therein, whereby to both receive said closure member when rotated to oppose said one rim and compress said gasket to form a seal between said insert and said rim.

2. The valve of claim 1 wherein said seat insert has a central opening corresponding to an opening in said valve body.

3. The valve of claim 2 wherein said seat insert is non-planar and shaped to generally correspond to the interior of said cavity adjacent said one rim.

4. The valve of claim 1 wherein said peripheral groove is of non-rectangular cross section.

5. The valve of claim 2 wherein said seat insert is relatively flexible.

6. The valve of claim 2 wherein said seat insert is comprised of metal.

7. The valve of claim 1 including a cover member for said valve body to enclose said cavity, said cover member having a cam ledge on the interior surface thereof, said cam ledge fitting within said cavity and positionable to press an upper edge of said seat insert toward said gasket and said one rim.

8. The valve of claim 1 including means to removably fasten said seat insert to the interior of said cavity.

9. The valve of claim 8 wherein the said means is located along one side of said seat insert opposite to said one side of said valve body.

10. The valve of claim 9 wherein the said means consists of at least one screw extending through a hole in said seat insert into said valve body.

11. The valve of claim 1 including a resilient coating on said closure member so as to be compressible against said seat insert.

12. The valve of claim 11 including a raised face on said closure member, said raised face being of a shape and position on said closure member so as to fit an opening in said seat insert.

13. An improved plug type valve wherein a valve closure member is rotatable within a generally cylindrical cavity of a valve body about an axis offset from an axis of said cavity so as to move from one side of said valve body to oppose one of an inlet and outlet rim in a wall of said cavity, said improvement comprising:
   a peripheral groove formed in the one rim;
   a resilient gasket laid in said groove;
   a thin seat insert placed over said gasket within said cavity so as to overlay said one rim and said groove, said seat insert having an upper edge, a central opening corresponding to an opening in said valve body, and having a curved cross section so as to generally conform to said cavity wall and being relatively flexible, whereby to receive said closure member when rotated to oppose said one rim and form a seal therebetween; and a cover member for said valve body to enclose said cavity, said cover member having a cylindrical lip and interior surface fitting within said cavity and a cam ledge on a peripheral portion of said interior surface engageable with said upper edge of said thin seat insert to press said upper edge against said gasket and said one rim.

14. The plug valve of claim 13 wherein said seat insert is metallic.

15. An improved plug type valve wherein a valve closure member is rotatable within a generally cylindrical cavity of a valve body about an axis offset from an axis of said cavity so as to move from one side of said valve body to oppose an inlet rim in a wall of said cavity, said improvement comprising:

a peripheral groove of non-rectangular cross section formed in the inlet rim;

a resilient gasket laid in said groove;

a thin metal seat insert placed over said gasket within said cavity so as to overlay said inlet rim and said groove, said seat insert having a central opening corresponding to an inlet opening in said valve body, and having a curved cross section so as to generally conform to said cavity wall and being relatively flexible, whereby to receive said closure member when rotated to oppose said inlet rim and form a seal therebetween; and fastening means to secure said metal seat insert to said cavity wall, said fastening means comprising at least one screw extending through a hole on a far side of said metal seat insert with respect to said one side of said valve body;

a raised face on said closure member, said raised face being of a shape and positioned on said closure member so as to fit the central opening in said metal seat insert; and a resilient coating on said closure member and about said raised face so as to be compressible against said metal seat insert.

16. The plug valve of claim 15 including an arcuate groove in a bottom of said valve cavity, said groove being adjacent said inlet rim and generally congruent therewith and receiving a lower edge of said thin metal seat insert.

17. The plug valve of claim 15 wherein said peripheral groove is of non-rectangular cross section.

* * * * *